(12) United States Patent
Yamada

(10) Patent No.: US 7,604,296 B2
(45) Date of Patent: Oct. 20, 2009

(54) VEHICLE SEAT RECLINING APPARATUS

(75) Inventor: Yukifumi Yamada, Toyota (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 503 days.

(21) Appl. No.: 11/295,545

(22) Filed: Dec. 7, 2005

(65) Prior Publication Data

US 2006/0145523 A1 Jul. 6, 2006

(30) Foreign Application Priority Data

Dec. 10, 2004 (JP) ............................. 2004-357577

(51) Int. Cl.
B60N 2/427 (2006.01)
(52) U.S. Cl. ................................... 297/367
(58) Field of Classification Search ................ 297/367, 297/369, 368, 374, 216.13, 216.14
See application file for complete search history.

(56) References Cited

U.S. PATENT DOCUMENTS

| | | | | |
|---|---|---|---|---|
| 5,857,746 | A * | 1/1999 | Barrere et al. ............... | 297/367 |
| 6,112,370 | A * | 9/2000 | Blanchard et al. ............ | 16/325 |
| 6,325,458 | B1 | 12/2001 | Rohee et al. | |
| 6,520,583 | B1 * | 2/2003 | Bonk ........................ | 297/367 |
| 6,554,361 | B2 * | 4/2003 | Reubeuze et al. ........... | 297/367 |
| 6,715,835 | B2 * | 4/2004 | Hoshihara et al. ........... | 297/366 |
| 6,848,745 | B1 * | 2/2005 | Tsuge ........................ | 297/367 |
| 7,341,311 | B2 * | 3/2008 | Ohba ........................ | 297/367 |
| 7,380,882 | B2 * | 6/2008 | Oki ........................... | 297/367 |
| 2001/0001220 | A1 | 5/2001 | Rohee et al. | |
| 2002/0017811 | A1 | 2/2002 | Cilliere et al. | |
| 2002/0053825 | A1 | 5/2002 | Reubeuze et al. | |
| 2004/0090101 | A1 * | 5/2004 | Andersson et al. ..... | 297/354.12 |
| 2007/0176478 | A1 * | 8/2007 | Ohba ........................ | 297/367 |

FOREIGN PATENT DOCUMENTS

| FR | 2 747 626 | 10/1997 |
|---|---|---|
| JP | 2000-245561 | 9/2000 |

OTHER PUBLICATIONS

European Search Report dated May 29, 2006.

* cited by examiner

*Primary Examiner*—David Dunn
*Assistant Examiner*—James Alex
(74) *Attorney, Agent, or Firm*—Buchanan Ingersoll & Rooney PC

(57) ABSTRACT

A vehicle seat reclining apparatus includes a first member attached to one of a seat cushion and a seatback and having an inner gear, a second member attached to the other of the seat cushion and the seatback for rotatably supporting the first member, a locking member having outer teeth facing the inner gear and movable in a radial direction, a guide wall portion provided at the second member, the guide wall portion being configured to guide the locking member in the radial direction by interposing the locking member from a first portion, and a second portion, of the locking member, the first portion and the second portion being defined in a circumferential direction of the locking member, and an outer teeth portion provided at the guide wall portion and facing the inner gear distantly in the radial direction.

23 Claims, 3 Drawing Sheets

VEHICLE SEAT RECLINING APPARATUS

This application is on the basis of and claims priority under 35 U.S.C. § 119 to Japanese Patent Application 2004-357577, filed on Dec. 10, 2004, the entire content of which is incorporated herein by reference.

FIELD OF THE INVENTION

This invention relates to a seat reclining apparatus adapted to a vehicle.

BACKGROUND

Conventionally, various vehicle seat reclining apparatuses are known for inclining a seatback relative to a seat cushion. These vehicle seat reclining apparatuses adjust and hold the seatback at an optimal inclination that is suitable for an occupant to be seated.

One of the known vehicle seat reclining apparatus is disclosed in JP2000-245561A (see FIG. 3). According to this vehicle seat reclining apparatus, when a large external force because of a vehicle impact, or the like, is applied in a rotational direction in which the seatback is inclined, a holding strength of the inclination is increased. More particularly, a first member of the vehicle seat reclining apparatus is provided with a substantially recess formed inner gear, and a second member of the vehicle seat reclining apparatus is provided with a guide wall. By operating (forward and backward) a locking member having outer teeth, with which the inner gear is meshed, in such a manner that the locking member is guided in the radial direction by means of the guide wall, the vehicle seat reclining apparatus changes lock/unlock condition (hold/release of the inclination) of the first and second members.

The vehicle seat reclining apparatus further includes an over-locking member for an emergency. The over-locking member is normally separated from the inner gear in the radial direction, and thus teeth of the over-locking member do not mesh with the inner gear. However, in a locked condition of the first and second members, when a large external force in the rotational direction is applied, the guide wall is pressed in a circumferential direction by means of the locking member and deformed. On this occasion, because of a deformation of the guide wall, the over-locking member is pressed outwardly in the radial direction, and the teeth of the over-locking member are thereby meshed with the inner gear. Accordingly, a locking strength of the first and second members of the vehicle seat reclining apparatus is increased and the holding strength of the inclination is thereby increased.

However, the vehicle seat reclining apparatus disclosed in JP2000-245561A includes at least, besides the locking members for normal lock/unlock operations (hold/release of the inclination), the over-locking member for an emergency. Therefore, the number of components is increased, and thus a manufacturing cost of the vehicle seat reclining apparatus being expensive.

A need thus exists for a vehicle seat reclining apparatus, which, without increasing the number of components, increases the holding strength in a condition where a large external force in the rotational direction is applied.

SUMMARY OF THE INVENTION

According to an aspect of the present invention, a vehicle seat reclining apparatus includes a first member attached to one of a seat cushion and a seatback and having an inner gear, a second member attached to the other of the seat cushion and the seatback for rotatably supporting the first member, a locking member having outer teeth facing the inner gear and movable in a radial direction, a guide wall portion provided at the second member, the guide wall portion being configured to guide the locking member in the radial direction by interposing the locking member from a first portion, and a second portion, of the locking member, the first portion and the second portion being defined in a circumferential direction of the locking member. A relative rotation of the first member and the second member is inhibited at a time that the outer teeth is meshed with the inner gear, wherein an inclination of the seatback relative to the seat cushion is held, the relative rotation of the first member and the second member is allowed at a time that the outer teeth is released from a meshed condition with the inner gear, wherein the inclination of the seatback relative to the seat cushion is released from being held. The vehicle seat reclining apparatus further includes an outer teeth portion provided at the guide wall portion and facing the inner gear distantly in the radial direction.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 2:
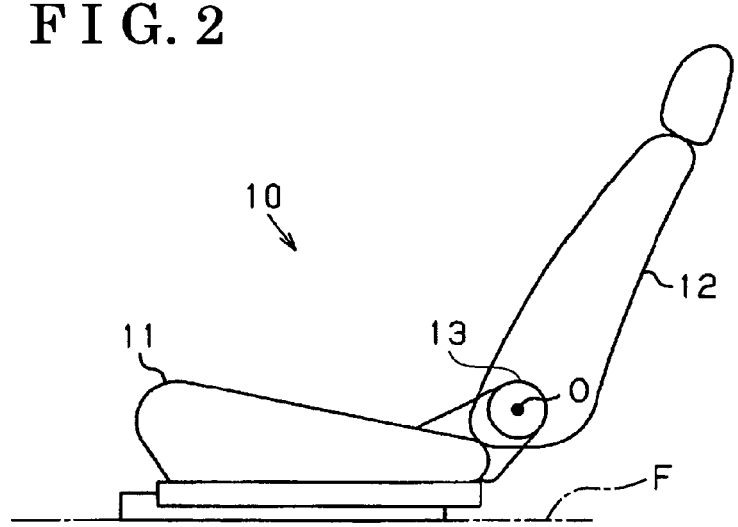
FIG. 2 is a side view illustrating a seat adapted to a vehicle according to the embodiment of the present invention.

An embodiment of the present invention will be explained hereinbelow with reference to the attached drawings. As illustrated in FIG. 2, a seat 10, for example for use in a vehicle includes a seat cushion 11 (i.e., a seat surface on which an occupant or any object is seated) mounted on a vehicle floor F, a seatback 12 (i.e., a seat portion onto which an occupant or any object reclines) supported at a rear end portion of the seat cushion 11, and a vehicle seat reclining apparatus 13 provided for adjusting and holding an inclination of the seatback 12 relative to the seat cushion 11. According to the embodiment of the present invention, provided can be a pair of seat reclining apparatuses 13 for the same purposes, the pair of which is counterposed in a lateral direction of a vehicle. Because the operations, and functions, of each of the pair of apparatuses 13 exhibit the same, the following explanation is applied to one of the pair of apparatuses 13. By operating an operating lever (not shown), a relative rotation at the seat reclining apparatus 13 is allowed, and thus the inclination of the seatback 12 becomes adjustable around a rotational axis O. Further, by releasing the operating lever, the relative rotation at the seat reclining apparatus 13 is inhibited or locked, and then the inclination of the seatback 12 is held.

Figure 1B:
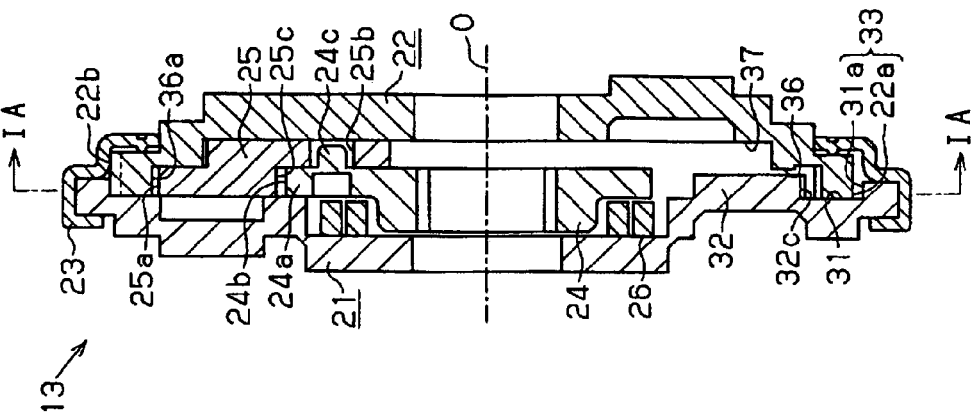
FIG. 1B is a sectional view taken along line IB-IB of FIG. 1A.
Figure 1A:
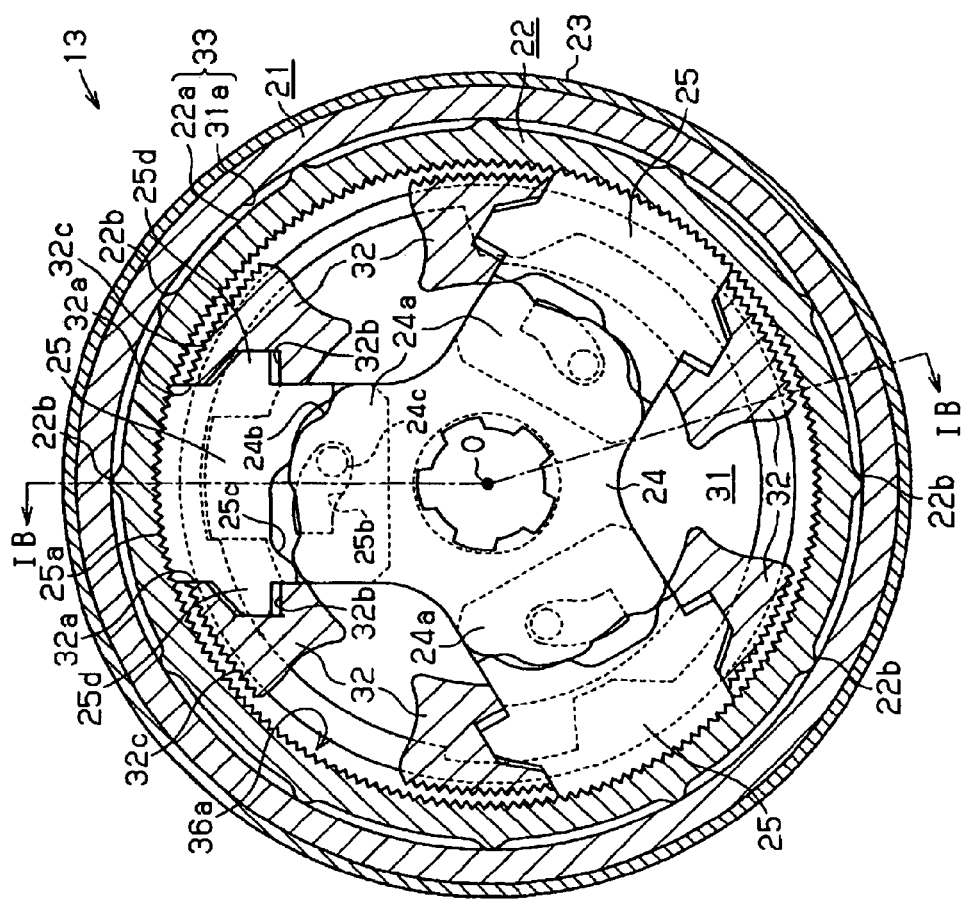
FIG. 1A is a sectional view of a seat reclining apparatus, as seen from a seat side view, according to an embodiment of the present invention, the sectional view which is taken along line IA-IA of FIG. 1B.

As illustrated in FIGS. 1A-1B, the seat reclining apparatus 13 includes a lower plate 21 (i.e., a second member) and an upper plate 22 (i.e., a first member). The lower plate 21 is associated with a seat cushion frame (not shown), which serves as a framework of the seat cushion 11, while the upper plate 22 is associated with a seatback frame (not shown), which serves as a framework of the seatback 12. The lower plate 21 rotatably supports the upper plate 22 as described below. The seat reclining apparatus 13 according to the embodiment of the present invention further includes a holder 23, a cam 24, plural poles 25 (i.e., locking members), and a spiral spring 26. Alternatively, or in addition, the number of the poles 25 can be one, two, or more than three.

The lower plate 21 is formed by a half-die cutting method into a substantially ring shape. By being connected to the seat cushion frame at a first side of an axis direction (left side in FIG. 1B), the lower plate 21 is virtually integrated with the seat cushion 11. Alternatively, or in addition, the lower plate 21 and the seat cushion frame (i.e., the seat cushion 11) may be integrally formed as an individual component.

The lower plate 21 is formed with a recessed portion 31, which is recessed from a second side of its axis direction (right side in FIG. 1B) into a form of a substantially coaxial circle. According to the embodiment of the present invention, the recessed portion 31 includes six guide wall portions 32, which axially project, at an amount substantially corresponding to an axially recessed amount of the recessed portion 31, from a bottom wall portion of the lower plate 21. These guide wall portions 32 form a pair with each adjacent one, and each pair of guide wall portions 32 is arranged at a predetermined angle (ca 120°). Each pair of guide wall portions 32 guides the pole 25 in the radial direction by interposing the pole 25 from a first portion, and a second portion, of the pole 25. The first portion and the second portion are defined in a circumferential direction of the pole 25. Each guide wall portion 32 includes a side surface 32a extending evenly in a radial direction so as to be in parallel with the side surface 32a of the adjacent guide wall portion 32 forming the pair. The lower plate 21 includes a guide groove extending in the radial direction between each adjacent side surface 32a for guiding a radial directional movement (forward and backward) of each pole 25. Alternatively, or in addition, the number of the pair of guide wall portions 32 can be one, two, or more than three.

Further, each pair of guide wall portions 32 includes, at a radially middle portion, a fitting recessed portion 32b, which is recessed from the side surface 32a in a circumferential direction opposite to each other. Moreover, each guide wall portion 32 includes, along an outer circumferential surface thereof, an outer teeth portion 32c.

The upper plate 22 is formed by the half-die cutting method into a substantially ring shape. By being connected to the seatback frame at a second side of the axis direction of the lower plate 21 (right side in FIG. 1B), the upper plate 22 is virtually integrated with the seatback 12. Alternatively, or in addition, the upper plate 22 and the seatback frame (i.e., the seatback 12) may be integrally formed as an individual component.

Alternatively, or in addition, the lower plate 21 may be connected to the seatback frame (i.e., the seatback 12), and the upper plate 22 may be connected to the seat cushion frame (i.e., the seat cushion 11).

The upper plate 22 is, at the rotational axis O, coaxially arranged with the aforementioned lower plate 21. According to the embodiment of the present invention, an external diameter of an outer circumferential surface 22a of the upper plate 22 is, by a predetermined distance, shorter than an inner diameter of an inner circumferential surface 31a of the recessed portion 31. The upper plate 22 is rotatably supported by the lower plate 21 at the outer circumferential surface 22a and the inner circumferential surface 31a, and the outer circumferential surface 22a and the inner circumferential surface 31a together form a bearing 33 of the lower plate 21 and the upper plate 22.

More particularly, the upper plate 22 includes, at the outer circumferential surface 22a, plural projecting portions 22b. Each projecting portion 22b is projected by a predetermined distance in the radial direction, and arranged circumferentially equidistant from each adjacent one at a predetermined angle. The upper plate 22 is rotatably supported by the lower plate 21 in such a manner that the plural projecting portions 22b, which are formed at the outer circumferential surface 22a, contact with the inner circumferential surface 31a. The seatback 12 is hence rotatably connected, through the lower plate 21 and the upper plate 22 (the seat reclining apparatus 13), to the seat cushion 11. Alternatively, or in addition, a convex portion similar to the projecting portion 22b may be provided at the inner circumferential surface 31a of the lower plate 21, and the convex portion may be contacted to the outer circumferential surface 22a of the upper plate 22.

The upper plate 22 is formed with a first recessed portion 36, which is recessed from a first side of the axis direction of the upper plate 22 (left side in FIG. 1B) into a form of a substantially coaxial circle. The first recessed portion 36 includes, at an inner circumferential surface, an inner gear 36a. According to the embodiment of the present invention, an inner diameter of a tip circle of the inner gear 36a is, by a predetermined distance, larger than an outer diameter of a tip of the outer teeth portion 32c. A shape of tooth of the inner gear 36a is substantially identical to that of the outer teeth portion 32c. In a condition where the upper plate 22 is attached to the lower plate 21, the inner gear 36a faces, at a predetermined distance away in the radial direction, the outer teeth portion 32c. Likewise, the inner gear 36a faces, in the radial direction, the guide groove arranged between each adjacent side surface 32a.

The first recessed portion 36 is formed with a second recessed portion 37, which has a smaller inner diameter than that of the first recessed portion 36 and is coaxially further recessed into a form of a substantially circle. In a condition where the upper plate 22 is attached to the lower plate 21, the first and second recessed portions 36 and 37 of the upper plate 22 and the recessed portion 31 of the lower plate 21 together form a space for housing the cam 24 and the pole 25.

In a condition where the upper plate 22 is attached to lower plate 21, the holder 23 being a substantially ring shape is assembled to the outer wall surface thereof, wherein a relative rotation between the lower plate 21 and the upper plate 22 are allowed by the holder 23 and an axial shift or slip between the lower plate 21 and the upper plate 22 is prevented.

According to the embodiment of the present invention, the cam 24 includes three cam portions 24a extending from its rotational axis center O in the radial direction at a predetermined angle, and a tip end portion of each cam portion 24a forms a cam surface 24b. Further, each cam portion 24a includes a projection 24c, which is projected in parallel with the axis direction. The cam 24 is rotatably connected to the lower plate 21 and housed between the lower plate 21 and the upper plate 22. In conjunction with the operation of the operating lever, the cam 24 rotates in a first direction (i.e., counterclockwise direction viewed in FIG. 1A). Alternatively, or in addition, the number of the cam portion 24a of the cam 24 can be one, two, or more than three.

A first end of the spiral spring 26 is latched or hooked to the lower plate 21, and a second end of the spiral spring 26 is latched or hooked to the cam 24. When the operation of the operating lever is released, by means of the spiral spring 26, the cam 24 is biased to rotate in a second direction (i.e., clockwise direction viewed in FIG. 1A).

The pole 25 being a substantially rectangular-shaped plate has a circumferential length, to some degree, shorter than a lateral width between each adjacent side surface 32a (i.e., the guide groove) in a circumferential direction. Each pole 25 includes, at a tip end portion, outer teeth 25a with which the inner gear 36a of the upper plate 22 is meshed. The pole 25 further includes, at a base end portion, a cam hole 25b thoroughly penetrating in a thickness direction thereof, i.e., in an axial direction of the lower plate 21. The cam hole 25b is inclined in the circumferential direction, and by inserting the projection 24c of the cam 24 into the cam hole 25b, each pole 25 engages with the cam 24.

Further, each pole 25 is formed with a step portion between the outer teeth 25a and the cam hole 25b, and an end surface of the step portion facing in the radial direction forms a pole cam surface 25c. The pole cam surface 25c extends to cross a side face of the pole 25 and extends to have the inclination relative to a pitch circle of the outer teeth 25a. In favor of contact between the cam surface 24b of the cam 24 with the pole cam surface 25c, the pole 25 engages with the cam 24. Alternatively, or in addition, the shape of the cam surface 24b or the cam hole 25b can be appropriately changed.

The pole 25 further includes, at a middle portion in the radial direction, a pair of fitting convex portions 25d that is projected from both ends in the circumferential direction of the pole 25. The fitting convex portion 25d being a substantially trapezoid fits into the fitting recessed portion 32b being a substantially trapezoid in such a manner that the movement (forward and backward) of the pole 25 in the radial direction is allowed. More particularly, between the fitting convex portion 25d and the fitting recessed portion 32b, a space with a predetermined radial distance is provided, and the movement of the pole 25 in the radial direction is thereby allowed. The fitting convex portion 25d and the fitting recessed portion 32b cooperate to configure a stress concentration means that provokes a plastic deformation described later.

In a condition where the cam 24 and the poles 25 are housed between the lower plate 21 and the upper plate 22 (i.e., a housing space), when the cam 24 rotates in a first direction (counterclockwise direction as viewed in FIG. 1A), the cam hole 25b of the pole 25 is pressed by the projection 24c of the cam 24, and the pole 25 moves inwardly in the radial direction through the guide groove. On this occasion, mesh between the outer teeth 25a of the pole 25 and the inner gear 36a of the upper plate 22 is released, and thus the upper plate 22 becomes rotatable relative to the lower plate 21.

In contrast, when the cam 24 rotates in a second direction (clockwise direction viewed in FIG. 1A), the cam hole 25b is pressed by the projection 24c, and the pole cam surface 25c is pressed by the cam surface 24b, and the pole 25 thereby moves outwardly in the radial direction through the guide groove. On this occasion, the outer teeth 25a of the pole 25 mesh with the inner gear 36a of the upper plate 22, and thus the upper plate 22 becomes unrotatable relative to the lower plate 21.

Basically, by means of the spiral spring 26, the cam 24 is biased in the second direction in order to inhibit a rotation of the upper plate 22 relative to the lower plate 21, in other words, a rotation of the seatback 12 relative to the seat cushion 11. Accordingly, the inclination of the seatback 12 relative to the seat cushion 11 can be held.

In contrast, when the cam 24 rotates, in response to operation of the operating lever, in the first direction against a biasing force of the spiral spring 26, the rotation of the upper plate 22 relative to the lower plate 21 is allowed, and the rotation of the seatback 12 relative to the seat cushion 11 is thereby allowed. Accordingly, the inclination of the seatback 12 relative to the seat cushion 11 becomes adjustable.

Figure 3:
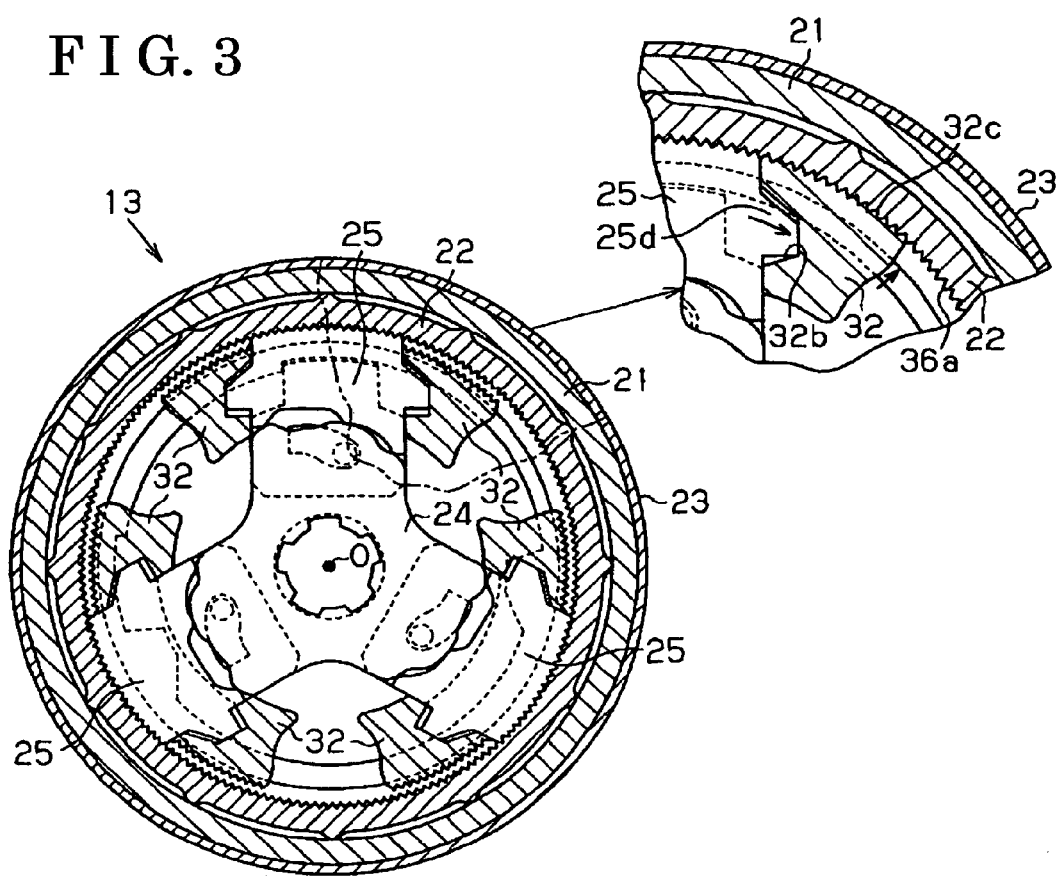
FIG. 3 is a sectional view of the seat reclining apparatus according to the embodiment of the present invention with a partially enlarged view thereof for explaining an operation of the seat reclining apparatus.

An operation of the seat reclining apparatus 13 according to the embodiment of the present invention in an emergency such as a vehicle impact, or the like, will now be explained. On this occasion, when a large external force in a rotational direction, in which the seatback 12 is inclined, is applied, as illustrated in an enlarged part in FIG. 3, the guide wall portion 32 is pressed in the circumferential direction and deformed (plasticity deformed). Because of the stress concentration between the fitting convex portion 25d and the fitting recessed portion 32b, the plastic deformation is encouraged. On this occasion, when the guide wall portion 32 is deformed to extrude radially outwardly, the outer teeth portion 32c meshes with the inner gear 36a. Accordingly, a locking strength of the lower plate 21 and the upper plate 22 is increased.

Figure 4:
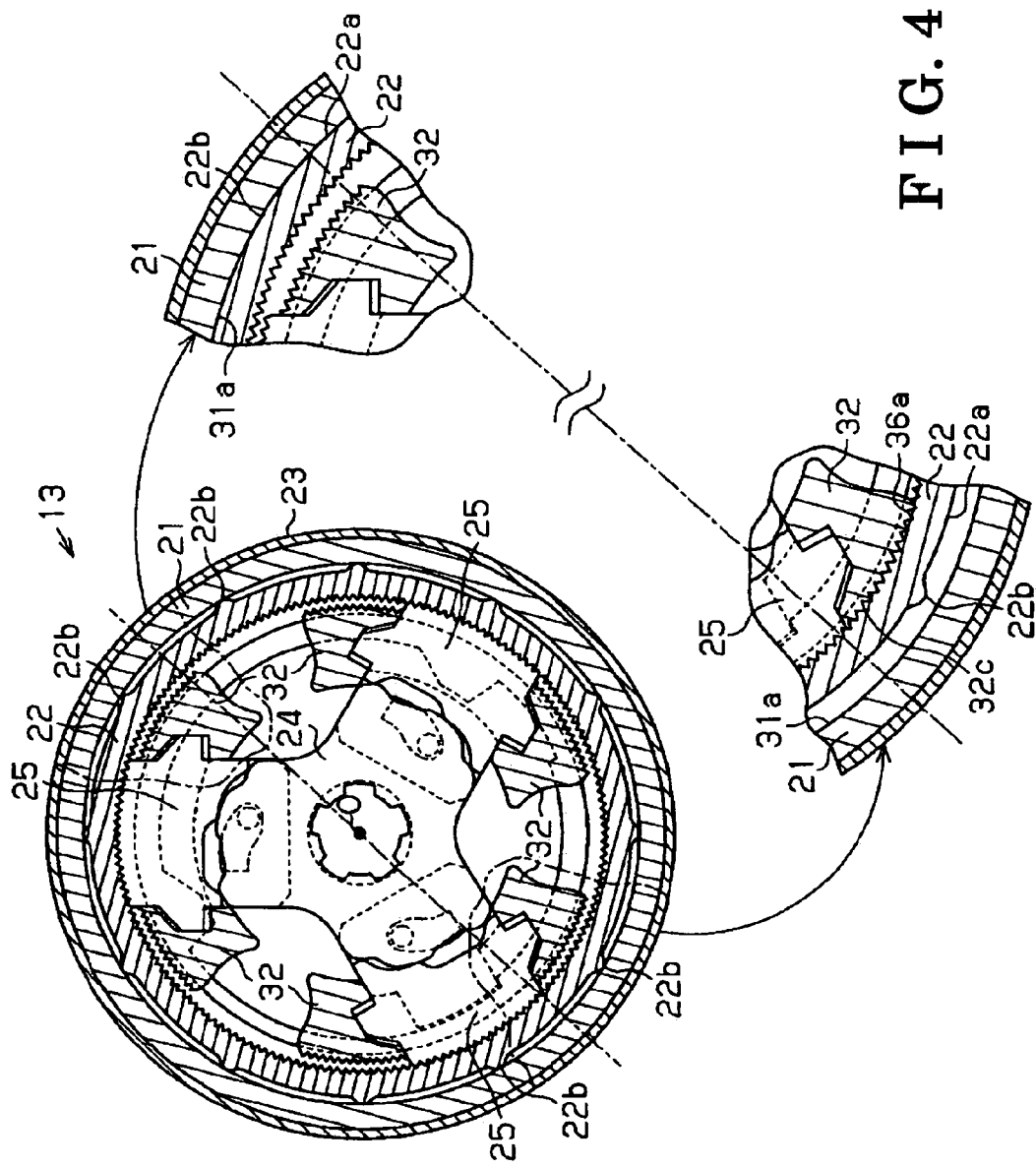
FIG. 4 is a sectional view of the seat reclining apparatus according to the embodiment of the present invention with partially enlarged views thereof for explaining an operation of the seat reclining apparatus.

In contrast, as illustrated in an enlarged part in FIG. 4, when one of the projecting portions 22b provided at a first side (upper side as viewed in FIG. 4) of the upper plate 22 is pressed due to an external force so that its convexity is disappeared, the lower plate 21 moves toward the upper plate 22 in the radial direction corresponding to the one of the projecting portions 22b (upper side as viewed in FIG. 4). On this occasion, the inner gear 36a of the upper plate 22 moves in an identical manner to the lower plate 21. Further, when the guide wall portion 32 (i.e., the outer teeth portion 32c) is located, relative to the pressed projecting portion 22b, at an opposite side in the radial direction (lower side as viewed in FIG. 4), the inner gear 36a of the upper plate 22 moves closer to the outer teeth portion 32c. Accordingly, by means of the easily deformable projecting portion 22b, by bringing the inner gear 36a of the upper plate 22 closer to the outer teeth portion 32c, mesh between the inner gear 36a and the outer teeth portion 32c is encouraged.

As described above, according to the embodiment of the present invention, the following effects can be obtained. First, according to the embodiment of the present invention, when a large external force because of a vehicle impact, or the like, is applied in the rotational direction in which the seatback 12 is inclined, the guide wall portion 32 is pressed by the pole 25 in the circumferential direction and deformed (plasticity deformed). On this occasion, when the guide wall portion 32 is deformed to extrude outwardly in the radial direction, the outer teeth portion 32c meshes with the inner gear 36a. Therefore, by providing the lower plate 21 formed with the guide wall portion 32, without increasing the number of components, the seat reclining apparatus 13 according to the embodiment of the present invention can increase the locking strength of the lower plate 21 and the upper plate 22. In consequence, a holding strength of the inclination of the seatback 12 relative to the seat cushion 11 can be increased. Further, an unintentional operation of the seatback 12 can be inhibited and an occupant can thereby be protected.

Further, according to the embodiment of the present invention, because the stress concentration is generated by means of the fitting convex portion 25d of the pole 25 and the fitting recessed portion 32b of the guide wall portion 32, the deformation of the guide wall portion 32 is encouraged and the outer teeth portion 32c of the guide wall portion 32 can smoothly be meshed with the inner gear 36a.

Moreover, according to the embodiment of the present invention, when the projecting portion 22b is pressed due to an external force so that its convexity is disappeared, the lower plate 21 moves toward the upper plate 22 in the radial direction corresponding to the projecting portion 22b. On this occasion, the inner gear 36a of the upper plate 22 moves in an identical manner to the lower plate 21. Further, when the guide wall portion 32 (i.e., the outer teeth portion 32c) is located, relative to the pressed projecting portion 22b, at the opposite side in the radial direction (lower side as viewed in FIG. 4), the inner gear 36a of the upper plate 22 moves closer to the outer teeth portion 32c. Accordingly, by means of the easily deformable projecting portion 22b, by bringing the inner gear 36a of the upper plate 22 closer to the outer teeth portion 32c of the guide wall portion 32, mesh between the inner gear 36a and the outer teeth portion 32c, at the time when a large external force in the rotational direction is applied, can be encouraged.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A vehicle seat reclining apparatus comprising:
a first member attached to one of a seat cushion and a seatback and having an inner gear;
a second member attached to the other of the seat cushion and the seatback for rotatably supporting the first member;
a locking member having outer teeth facing the inner gear and movable in a radial direction;
a one-piece first guide wall portion comprising a first guide wall facing a first side wall of the locking member in a circumferential direction and a first outer teeth portion integrally formed with the first guide wall and facing the inner gear distantly in the radial direction, a one-piece second guide wall portion comprising a second guide wall facing a second side wall of the locking member in the circumferential direction and a second outer teeth portion integrally formed with the second guide wall and facing the inner gear distantly in the radial direction, the first guide wall portion and the second guide wall portion being configured to guide the locking member in the radial direction by interposing the locking member between the first guide wall and the second guide wall, the first guide wall portion being configured to be deformed by a pressure applied in the circumferential direction for meshing the first outer teeth portion with the inner gear, the second guide wall portion being configured to be deformed by a pressure applied in the circumferential direction for meshing the second outer teeth portion with the inner gear; wherein a relative rotation of the first member and the second member being inhibited at a time that the outer teeth of the locking member is meshed with the inner gear, whereby an inclination of the seatback relative to the seat cushion is held, and wherein the relative rotation of the first member and the second member being allowed at a time that the outer teeth of the locking member is released from a meshed condition with the inner gear, whereby the inclination of the seatback relative to the seat cushion is released from being held.

2. The vehicle seat reclining apparatus according to claim 1, further comprising:
a stress concentration means for concentrating a circumferential directional pushing force applied to the first guide wall portion, the stress concentration means being provided between the locking member and the first guide wall portion.

3. The vehicle seat reclining apparatus according to claim 2, wherein
the stress concentration means includes:
a fitting convex portion formed at the locking member and projected in the circumferential direction of the locking member; and
a fitting recessed portion formed at the first guide wall portion and recessed in the circumferential direction, the fitting recessed portion being configured to be fit with the fitting convex portion and to allow a movement of the locking member in the radial direction.

4. The vehicle seat reclining apparatus according to claim 1, further comprising:
a projecting portion formed at one of an outer circumferential surface of the first member and an inner circumferential surface of the second member, both of which cooperate to form a bearing, the projecting portion being contacted to the other one of the outer circumferential surface of the first member and the inner circumferential surface of the second member.

5. The vehicle seat reclining apparatus according to claim 2, further comprising:
a projecting portion formed at one of an outer circumferential surface of the first member and an inner circumferential surface of the second member, both of which cooperate to form a bearing, the projecting portion being contacted to the other one of the outer circumferential surface of the first member and the inner circumferential surface of the second member.

6. The vehicle seat reclining apparatus according to claim 3, further comprising:
a projecting portion formed at one of an outer circumferential surface of the first member and an inner circumferential surface of the second member, both of which cooperate to form a bearing, the projecting portion being contacted to the other one of the outer circumferential surface of the first member and the inner circumferential surface of the second member.

7. The vehicle seat reclining apparatus according to claim 4, wherein
the projecting portion includes plural projecting portions formed, at a regular interval, at the one of the outer circumferential surface of the first member and the inner circumferential surface of the second member.

8. The vehicle seat reclining apparatus according to claim 5, wherein
the projecting portion includes plural projecting portions formed, at a regular interval, at the one of the outer circumferential surface of the first member and the inner circumferential surface of the second member.

9. The vehicle seat reclining apparatus according to claim 6, wherein
the projecting portion includes plural projecting portions formed, at a regular interval, at the one of the outer circumferential surface of the first member and the inner circumferential surface of the second member.

10. The vehicle seat reclining apparatus according to claim 1, wherein
the first member being substantially ring shape and having the inner gear at its Inner circumferential surface is ached to the seat cushion, and
the second member being substantially ring shape for rotatably supporting the first member at an inner side of the first member is attached to the seatback.

11. The vehicle seat reclining apparatus according to claim 1, further comprising:
a substantially trapezoid fitting convex portion extending from the locking member;
a substantially trapezoid fitting recessed portion formed at the first guide wall portion and being fit with the fitting convex portion, a space being defined in the radial direction between the fitting convex portion and the fitting recessed portion.

12. The vehicle seat reclining apparatus according to claim 1, further comprising:
a projecting portion formed at the outer circumferential surface of the first member and contacted to the inner circumferential surface of the second member.

13. The vehicle seat reclining apparatus according to claim 2, further comprising:
a projecting portion formed at the outer circumferential surface of the first member and contacted to the inner circumferential surface of the second member.

14. The vehicle seat reclining apparatus according to claim 3, further comprising:
a projecting portion formed at the outer circumferential surface of the first member and contacted to the inner circumferential surface of the second member.

15. The vehicle seat reclining apparatus according to claim 10, further comprising:
a projecting portion formed at the outer circumferential surface of the first member and contacted to the inner circumferential surface of the second member.

16. The vehicle seat reclining apparatus according to claim 1, further comprising:
a projecting portion formed at the outer circumferential surface of the first member at a regular interval.

17. The vehicle seat reclining apparatus according to claim 2, further comprising:
a projecting portion formed at the outer circumferential surface of the first member at a regular interval.

18. The vehicle seat reclining apparatus according to claim 3, further comprising:
a projecting portion formed at the outer circumferential surface of the first member at a regular interval.

19. The vehicle seat reclining apparatus according to claim 10, further comprising:
a projecting portion formed at the outer circumferential surface of the first member at a regular interval.

20. The vehicle seat reclining apparatus according to claim 3, wherein the first guide wall and the second guide wall guide the first side wall and the second side wall of the locking member, respectively, and the fitting recessed portion is positioned at a side facing the locking member.

21. The vehicle seat reclining apparatus according to claim 3, wherein a clearance exists between the fitting convex portion and the fitting recessed portion, the clearance allowing radial movement of the locking member.

22. The vehicle seat reclining apparatus according to claim 1, wherein the first guide wall portion and the second guide wall portion are integrally formed with one another.

23. The vehicle seat reclining apparatus according to claim 1, wherein the first guide wall portion and the second guide wall portion are provided at the second member.

* * * * *

UNITED STATES PATENT AND TRADEMARK OFFICE
CERTIFICATE OF CORRECTION

PATENT NO. : 7,604,296 B2
APPLICATION NO. : 11/295545
DATED : October 20, 2009
INVENTOR(S) : Yukifumi Yamada It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 624 days.

Signed and Sealed this

Fifth Day of October, 2010

David J. Kappos
*Director of the United States Patent and Trademark Office*